Figure 1:
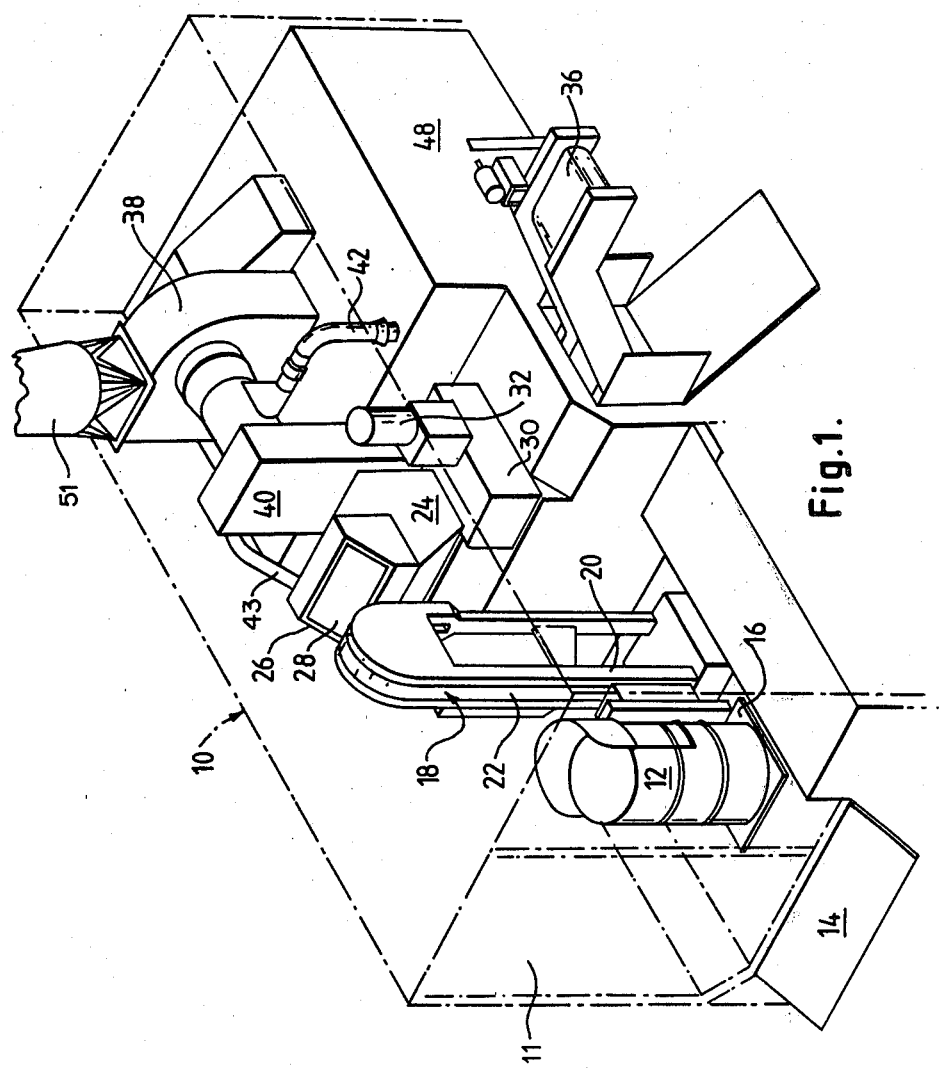

United States Patent [19]

Meadows

[11] 4,356,981
[45] Nov. 2, 1982

[54] AEROSOL DISPOSAL UNIT

[75] Inventor: Frank N. Meadows, High Wycombe, England

[73] Assignee: Hoveringham Group Limited, Nottinghamshire, England

[21] Appl. No.: 147,204

[22] Filed: May 6, 1980

[30] Foreign Application Priority Data

May 9, 1979 [GB] United Kingdom ............... 7915963

[51] Int. Cl.³ ............................................ B02C 19/12
[52] U.S. Cl. ....................................... 241/16; 241/18; 241/23; 241/31; 241/57
[58] Field of Search ................ 241/16, 18, 23, 31, 241/37.5, 99, 60, 57, 101.5, DIG. 38

[56] References Cited

U.S. PATENT DOCUMENTS 1,338,845  5/1920  Schutz ............................ 241/60 X
3,972,481  8/1976  Naporano et al. ................ 241/31 X

FOREIGN PATENT DOCUMENTS 52-25475  2/1977  Japan ................................... 241/31

Primary Examiner—Mark Rosenbaum
Attorney, Agent, or Firm—Weingarten, Schurgin & Gagnebin

[57] ABSTRACT

A disposal unit for the safe disposal of aerosol containers and the like pressurized containers for inflammable gases or toxic chemicals, in which the containers are punctured or otherwise destroyed, by for example a shredder fed from a sealed hopper, and separated from fluid initially contained therein, in an enclosure through which a stream of air passes to an exhaust outlet but which is otherwise sealed against the egress of gases at normal operating temperatures and pressures. The stream of air passing through the enclosure is made sufficient to dilute the gases released following destruction of the containers to a level below the flash point of the gas/air mixture.

11 Claims, 2 Drawing Figures

AEROSOL DISPOSAL UNIT

This invention relates to a disposal unit and more, particularly, to a unit for disposing safely of aerosol containers and the like pressurised, containers for inflammable gases or toxic chemicals.

Dumping of full aerosol containers on land-fill sites is often not permitted owing to the environmental and safety hazards. This presents great problems especially to manufacturers operating fully automated processes since it is often impossible to identify faulty batches until after at least a short production run. It is equally difficult to dispose of fuel gas cartridges (e.g. butane or propane) so that stocks of faulty cartridges need to be stored remote from personnel and buildings and require protection from the elements to avoid deterioration of the metal which could give rise to leaks.

Previous attempts to render the containers safe for transport and dumping have resulted in fires arising from the release of butane which forms invisible pools on the ground and which has subsequently been ignited giving rise to explosions and fire.

What we now propose, in accordance with the present invention, is a disposal unit, particularly for aerosol and the like containers, in which the containers are punctured or otherwise destroyed and separated from the fluid initially contained therein, in an enclosure through which a stream of air passes to an exhaust but which otherwise is sealed against the egress of gas at normal operating temperatures and pressures.

In a preferred embodiment of disposal unit according to this invention, the containers are destroyed by a shredder fed from a sealed hopper and delivering punctured containers to a device for separating the container and its contents, disposed within the enclosure having an inlet for air stream and an outlet for an exhaust stream but which is otherwise sealed against the egress of gas. The outlet is preferably connected to a fan or other pump whereby the flow of air is induced and, further, the compartment and/or the hopper is sealed by a flap, preferably a hinged flap, which opens when subject to extreme pressures within the compartment such as generated following an explosion.

Further, to reduce the risk of an explosion the rate of air flow through the compartment may be selected to avoid producing an explosive mixture with the aerosol propellants or other gases from the container.

In a disposal unit according to this invention inflammable gases are not permitted to escape so as to constitute an explosive hazard. Each container is ruptured in such an environment that gases are allowed to escape and expand in a controlled way. The gases are mixed with air in such proportions as to render the mixture safe. Also, in the preferred embodiment there are safeguards to contain any explosion and to ensure the safety of the operator. According to another aspect of this invention we propose a method of disposing of aerosol containers and the containers for inflammable gases in which the containers are punctured or otherwise destroyed and separated from fluid initially contained therein, within an enclosure having an exhaust outlet but which is otherwise sealed against the egress of gas at normal operating temperatures and pressures, and passing through the enclosure a stream of air sufficient to dilute the gases released following destruction of the containers to a level below the flash point of the gas/air mixture.

Figure 2:
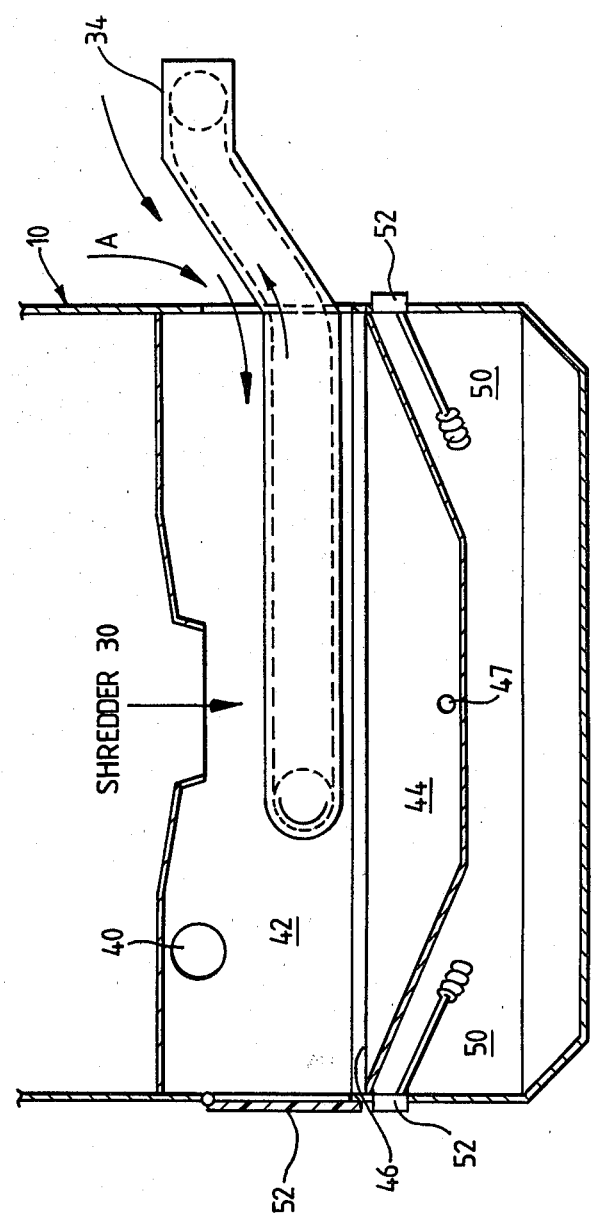

An embodiment of this invention will now be described by way of example with reference to the accompanying drawings of which:

FIG. 1 is a perspective view of a disposal unit according to this invention; and FIG. 2 is a schematic cross-sectional view of the unit shown in FIG. 1.

The disposal unit shown in the figures is built within a container or skip 10 of standard size to facilitating transportation of the unit between sites at which stocks of aerosol containers are held for disposal. Because of the risk of explosion, operation is by remote control; access to the container or skip 10 being closed by a mesh gate 11 fitted with micro-switches whereby operation of the unit is prevented unless the gates are closed.

A drum 12 filled with aerosol containers is wheeled up a ramp 14 leading to the interior of the container or skip 10. It is then placed on the platform 16 of a hoist 18 which may be in any convenient form but in the embodiment shown comprises a pillar 20 having a movable track 22 to which the platform 16 is secured whereby the drum 12 is raised and inverted so to empty the contents into a hopper 24. Hinged to the hopper 24 is a frame 26 along the top edge of which is secured a heavy rubber mat or hood 28 which assists in containing a possible explosion as described below.

By gravity feed, aerosol containers from the hopper 24 enter a shredder 30 driven by a motor 32 and having intermeshing rollers or claws (not shown) which tear and compact the metal walls of the container so releasing its contents which as explained above may be gaseous or liquid and either inflammable or toxic.

Beneath the shredder 30 is a conveyor 34 the continuous moving belt 36 of which is perforate or otherwise permeable to liquid so that liquid drains away from the shredded containers before they are transported from the container or skip 10.

To avoid escape to atmosphere of gases and vapours which it will be appreciated may be poisonous or inflammable, a current of air is drawn over the conveyor in the direction indicated by arrows A, this being achieved by means of a motor driven fan 38 the suction side of which is connected to a duct 40 communicating with the conveyor compartment 42 beneath the shredder and via a duct 43 to the hopper so also avoiding the escape of gases up through the shredder, the vacuum produced within the hopper 24 tending to hold down the rubber mat 28 to produce a seal.

The conveyor 34 is supported in the compartment 42 upon beams 46 bridging a bath 44 in which collects the liquid draining from the shredded containers through the perforate belt 36. This liquid is then pumped along a pipe communicating with an outlet 47 of the bath 44, to a waste storage tank 48. Surrounding the bath 44 is a water jacket 50 heated by electrical emmersion heaters 52 whereby the liquid can be maintained at a desired temperature to promote evaporation and evaporation can be effected even after shut down. This also avoids the formation of ice caused by evaporation of propellant.

From the fan 38, fumes and vapours are exhausted to atmosphere via a (typically 20 ft.) high stack 51 possibly fitted with a flame trap, or a smooth venturi for increasing the velocity and entrainment of the air at the top of the stack so reducing the probability of ignition. The stack can be dismantled and stowed within the container or skip during transportation.

In addition to the hood 28 and seals (not shown) at each side and underneath the conveyor, the compartment 42 has a freely hinged flap 52, preferable of transparent plastics material to permit observation of the shredding/draining process, having a peripheral seal so that the vacuum created by the fan holds the flap firmly in place to form a seal. The compartment 42 is in fact sealed against the egress of all gases except for the controlled exhaust stream delivered to atmosphere via the stack 51.

An important feature of the disposal unit described above is that a controlled explosion is possible without serious damage or injury to the operator, the pressure generated by the blast being released by the hood 28 and hinged flap 52.

I claim:

1. A method of disposing of containers for aerosols, inflamable gases and toxic chemicals comprising the steps of:
   destroying said containers, by puncturing or otherwise, within an enclosure;
   separating fluid and gases initially contained within said containers from the destroyed containers;
   drawing a stream of air through a region having said destroyed containers and separated fluid to an exhaust outlet;
   said stream of air being sufficient to dilute any gases released by destruction of the containers to a level below the flash point of the gas and air mixture;
   conveying the destroyed containers on a continuous belt to a location outside said enclosure;
   draining through said continuous belt fluids separated from the containers during destruction;
   collecting the drained fluids into a bath below said continuous belt;
   heating the fluids drained into said bath;
   otherwise sealing said enclosure against the egress of gas at normal operating temperatures and pressures from said enclosure.

2. A disposal unit for containers of aerosols, inflammable gases, and toxic chemicals comprising:
   an enclosure;
   means for receiving said containers within said enclosure;
   means for destroying received containers, by puncturing or otherwise, thereby to separate said containers from their contents;
   means for drawing a stream of air through said enclosure, in the vicinity of the destroyed containers, to an exhaust outlet;
   means for otherwise sealing said enclosure against the egress of gas at normal operating temperatures and pressures;
   a conveyer having a continuous belt and positioned to receive destroyed containers, said conveyer extending out of said enclosure through a discharge opening;
   a bath positioned to receive liquid contents separated from said containers through said conveyer;
   said conveyer being permeable to liquid to permit liquids separated from said containers to collect in said bath;
   means for heating the liquid collected in said bath.

3. The disposal unit of claim 2, wherein:
   said means for drawing a stream of air through said enclosure includes pump means for drawing gases from said enclosure to said exhaust outlet whereby the environment of the destroyed containers is maintained at a reduced pressure;
   an inlet opening is provided in said enclosure for air drawn by said pump means.

4. The disposal unit of claim 2, further including a pressure relief outlet in said enclosure.

5. The disposal unit of claim 4, wherein said pressure relief outlet includes an opening covered by a hinged flap and operative to be held in a closed sealing condition by external air pressure.

6. The disposal unit of claims 2, 3, 4, or 5 wherein:
   said destroying means includes a shredder;
   said receiving means includes a sealed hopper;
   said shredder being operative to deliver destroyed containers to said conveyer.

7. The disposal unit of claim 2 wherein:
   said receiving means includes a hopper having a flap held, by the drawing of said stream of air, in a sealing arrangement on said hopper;
   said discharge opening being operative to admit air to said enclosure to provide said stream of air.

8. The disposal unit of claim 2, further including:
   a waste liquid storage tank;
   a conduit for draining said bath to said waste storage tank.

9. The disposal unit according to claims 2 or 8, and further comprising:
   a water jacket surrounding said bath;
   said heating means including means for heating said water jacket.

10. The disposal unit of claim 2, further including:
    a stack fitted with a flame trap and operative to discharge gas from said exhaust outlet to the atmosphere.

11. The disposal unit of claim 2 further including:
    a stack fitted with a venturi for discharging gases from said exhaust outlet to the atmosphere.

* * * * *